United States Patent

[11] 3,610,665

| [72] | Inventor | Harold E. Mingo<br>Clifton, N.J. |
|---|---|---|
| [21] | Appl. No. | 860,993 |
| [22] | Filed | Sept. 25, 1969 |
| [45] | Patented | Oct. 5, 1971 |
| [73] | Assignee | Lyn-Mont Hose and Fitting Corp. Inc.<br>North Arlington, N.J. |

[54] COUPLING
3 Claims, 7 Drawing Figs.

[52] U.S. Cl. .................................................. 285/256,
285/259
[51] Int. Cl. ........................................................ F16l 33/20
[50] Field of Search .......................................... 285/256,
259, 149; 138/109

[56] References Cited
UNITED STATES PATENTS
| 3,347,571 | 10/1967 | New | 285/256 X |
| 1,825,005 | 9/1931 | Loughead | 285/256 |
| 2,453,997 | 11/1948 | MacWilliam | 285/149 X |
| 3,165,338 | 1/1965 | Moss | 285/256 |
| 3,423,109 | 1/1969 | New et al. | 285/149 |

FOREIGN PATENTS
| 1,247,774 | 8/1967 | Germany | 285/256 |
| 1,253,533 | 11/1967 | Germany | 285/149 |

*Primary Examiner*—Dave W. Arola
*Attorney*—Popper, Bain, Bobis & Gilfillar

ABSTRACT: A coupling having enhanced resistance to rupture in which the reduced diameter end of a hose is flared and a ferrule is crimped to seize the flared portion of the hose, and an arcuate external enlargement is formed over the crimped area.

PATENTED OCT 5 1971 3,610,665

HAROLD E. MINGO
INVENTOR.

BY Popper Bain & Bobis
Attys

COUPLING

BACKGROUND OF THE INVENTION

1. Field of Invention

The present invention relates generally to couplings for hose and specifically to couplings for hoses in which the end of the hose is rigidly seized by a ferrule crimped on a stem.

2. Description of Prior Art

In order to connect to a source, or to a receiver, the hose is rigidly attached to a threaded fitting, which is then threaded to a cooperatively threaded member of the source or receiver. Numerous ways of attaching the hose to the fitting are known. The most common and most satisfactory method is by crimping a ferrule onto the end of the hose so that it may be functionally engaged with the fitting. The larger the hose, the greater the strength of the coupling is required, if it is to meet the rigors of use. Often reinforced hose is used. Usually, the coupling fails before the hose. A most common cause of failure is the hose pulling from the coupling. Also the ferrule may lose its grip on the hose as a result of heavy pressure impulses. The compression of the hose in the coupling may weaken the hose where it is crimped, and the hose may burst. High temperature may have the same effect. Whipping of the hose may relax the grip of the ferrule and rupture the hose at the coupling. These observable defects demonstrate that hoses are highly resistant to deterioration, but couplings ordinarily are not.

SUMMARY OF INVENTION

It has been found that a coupling can be made which has enhanced resistance to pulling apart, to bursting, and to pulsing. This is accomplished by flaring a reduced end of a hose by forcing it onto a flared enlargement on a stem, and then crimping a ferrule over the flared portion until heavy thickened flow collar is formed over the flared portion, while the adjacent portion of the hose is also seized by the crimped ferrule.

THE DRAWINGS

These objects and advantages as well as other objects and advantages may be attained by the device shown by way of illustration in the drawings in which:

FIG. 3 is a vertical sectional view of the fitting with the ferrule crimped on;

PREFERRED EMBODIMENT

Figure 1:
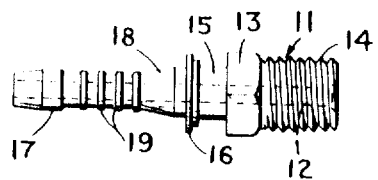
FIG. 1 is a side elevational view of a fitting.
Figure 2:
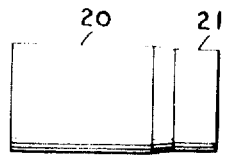
FIG. 2 is a ferrule or collar.

Referring now to the drawings in detail, there is provided a fitting 11. The fitting has a central axial passage 12. A hexagonal external portion 13 is provided for gripping with a wrench. One end 14 of the fitting is threaded. On the other side of the portion 13 there is a channel 15 defined between the portion 13 and a flange or lip 16. Beyond the lip there is an axial stem 17. A tapered radial enlargement 18 is provided on the stem 17 immediately adjacent to the lip 16. The stem 17 may be provided with a plurality of ribs 19 to enhance the fit of a hose as will later be referred to.

Figure 3:
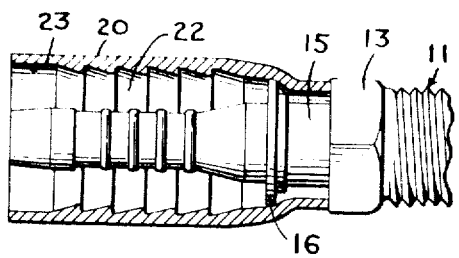
Figure 5:
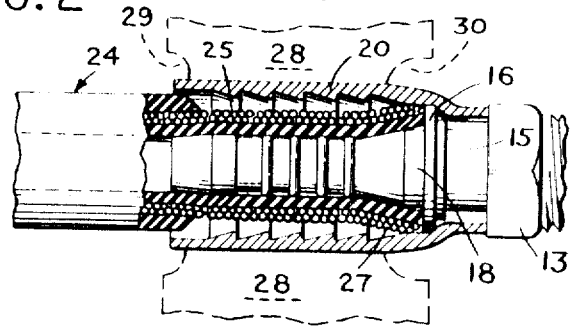
FIG. 5 is a vertical, partially sectional view of the reduced end of the hose inserted into the space between the ferrule and the stem, with the reduced end of the hose flared over the enlargement on the stem adjacent to the flange; the segmented crimping die is shown by the dotted lines.

A collar or ferrule 20 is applied to the fitting 11 by advancing it over the lip 16 until it is against the hexagonal portion 13. Pressure is then applied to the end 21 of the collar, 20 deforming it inwardly into the channel 15 and affirmatively attaching the collar 20 to the fitting 11, seizing the channel 15 between the lip 16 and the hexagonal enlargement 13. (See FIG. 3) This will provide a space 22 between the collar 20 and the stem 17 which space 22 is closed at one end by the flange or lip 16. The collar 20 is provided with a small radial channel or counter bore 23.

Figure 4:
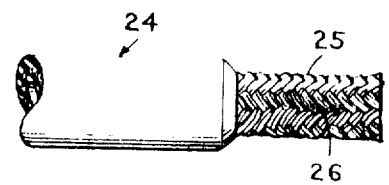
FIG. 4 is a side elevational view of a wire-reinforced hose with the end thereof reduced to the reinforcement.

The assembly of the fitting 11 and the collar 20 is now prepared for the insertion of a hose. A hose 24 is provided. This hose has approximately the diameter of the collar 20. In order to fit the end of the hose 24 into the space 22, its external diameter is reduced until it is dimensionally able to enter the space 22. If a reinforced hose is used it is preferable that the reduction of the diameter of the hose 24 should not be greater than the reinforcement so that the reinforced reduced diameter portion 25 of the hose will just be sufficient to fit into the space 22. For purposes of illustration, there has been shown in the FIGS. a reinforced hose reinforced with wire 26. When the reduced portion 25 of the hose has been inserted in the space 22 (FIG. 4) it will be jammed by the enlargement 18's rather tight engagement with the collar 20. The length of the reduced portion 25 should be just sufficient to bring the hose 24 into abutment with the side of the lip 16. Since the reduced portion 25 does not quite fill the collar 20, the jamming of the reduced portion 25 against the enlargement 18 produces a flaring of the reduced portion 25 so that the end 27 is flared and completely fills the area adjacent to the flange 16.

Figure 6:
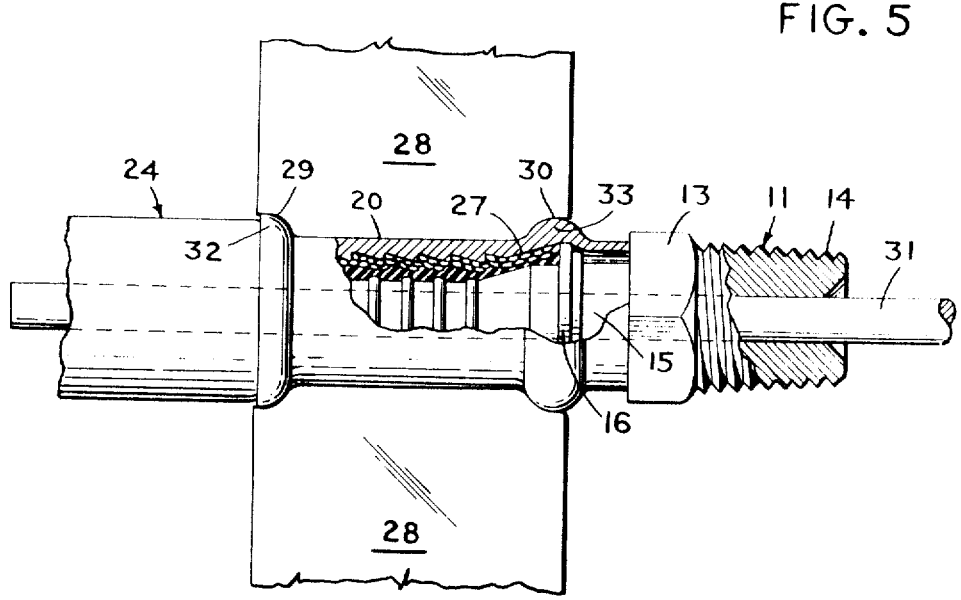
FIG. 6 is a vertical, partially sectioned view of the assembly shown in FIG. 5 after the crimping die has formed large and small flow collars.
Figure 7:
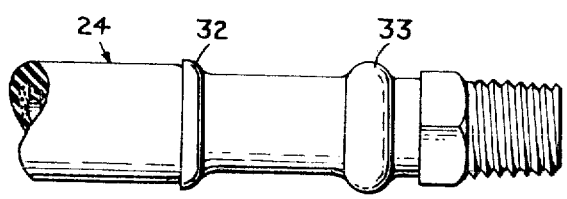
FIG. 7 is a side elevational view of the completed coupling.

The final step of forming is now carried out. Pressure is applied to the collar 20 by an annular segmented die 28. This die has a small end-flow channel 29 which is annular and a larger end-flow channel 30 which is also annular. Pressure on the order of 28 tons varying of course, in accordance with the size of the assembly is applied. In view of the rather large pressure applied by the die 28, it is preferable that the stem 17 be preserved against collapse by the insertion of a support pin or mandrel 31 which can be withdrawn when the pressure of the die 28 is relieved. It is to be noted that the fitting 11 and the collar 20 are made of steel. With the application of pressure by the segmented die 28 to the collar at a central point, spaced inwardly from the end of the collar, the internal and external diameters of the collar are severely reduced at the point of application of pressure, thereby seizing the hose 24 between the collar 20 and the stem 17. Reference to the FIG. 6 will disclose that the bell or flared inner end of the hose 24 is accentuated and the flaring of the end of the hose is enhanced, in part because of the enlargement 18 on the stem 17 and in part because of the compression of the collar 20. The pressure exerted by the segmented die 28 causes a deformation of the collar. The small flow channel 29 receives a bulge or blister 32 formed by the metal flow of the collar. Likewise at the large flow channel 30 a large blister or bulge 33 is formed. The compression of the collar 20 in the area of the flared end 27 of the hose reduces the outer diameter of the end of the hose near the end 27, thereby accentuating the belled end of the hose 24. The formation of the large blister 33 has the effect internally of more affirmatively capturing the belled end of the hose and providing a coupling of great strength and resistance to rupture under most normal conditions of useage.

Rupture, pull, impulse and burst tests conducted upon hoses made in accordance with the present invention yield test results which demonstrate that such hoses far exceed the strength of hoses of conventional construction insofar as resistance to bursting, to disintegration under pulling, to failure under impulse, and higher burst strength at the fitting.

The foregoing description is merely intended to illustrate an embodiment of the invention. The component parts have been shown and described. They each may have substitutes which may perform a substantially similar function; such substitutes may be known as proper substitutes for the said components and may have actually been known or invented before the present invention.

I claim:

1. A coupling comprising:

a. a fitting,
b. a hollow stem on the fitting,
c. an external radial flange on the hollow stem,
d. a seat for a deformed portion of a ferrule on one side of the flange,
e. a ferrule disposed coaxially with the stem,
f. an externally flared portion on the stem on the side of the flange opposite said seat increasing in cross sectional area as it approaches the flange,
g. a hose,
h. an internal reinforcing layer in the hose,
i. the external portion of the hose over the reinforcing layer removed at the end thereof to lay bare the outside of the reinforcing layer, and leaving the internal layer of the hose at the end thereof,
j. the exposed reinforcing layer of the hose and the remaining internal layer of the hose intruded between the ferrule and the stem, and distended over the flared portion of the stem,
k. the ferrule deformed radially inwardly over the seat on the stem, and deformed radially inwardly over and into tight engagement with the exposed reinforcing layer of the hose, thereby forcing said hose into tight engagement with said stem; and during such deformation, an axially extending, arcuate thickened portion is formed on said ferrule overlying said flange and extending to each side thereof, the radial thickness of the said arcuate portion of the ferrule immediately adjacent to the side of the flange facing said flared portion being greater than the thickness of the other portions of the ferrule immediately adjacent thereto.

2. The device according to claim 1 in which the reinforcing layer is wire.

3. The device according to claim 1 and a plurality of external ribs on the stem.